J. K. SHARPE.
GRAIN SAVING DEVICE FOR THRESHING MACHINES.
APPLICATION FILED JULY 27, 1914.

1,180,673.

Patented Apr. 25, 1916.

Witnesses:
Adelaide Kearns
Clara Dilks

Inventor
Joseph K. Sharpe,
By James A. Walsh,
Attorney.

UNITED STATES PATENT OFFICE.

JOSEPH K. SHARPE, OF INDIANAPOLIS, INDIANA.

GRAIN-SAVING DEVICE FOR THRESHING-MACHINES.

1,180,673.  Specification of Letters Patent.  Patented Apr. 25, 1916.

Application filed July 27, 1914. Serial No. 853,295.

*To all whom it may concern:*

Be it known that I, JOSEPH K. SHARPE, a citizen of the United States, residing at Indianapolis, in the county of Marion and State of Indiana, have invented certain new and useful Improvements in Grain-Saving Devices for Threshing-Machines, of which the following is a specification.

My present invention relates to improvements in grain-saving devices for threshing machines of the character which is the subject of my co-pending application Serial No. 782,882, and consists in certain details of construction and arrangements of parts as will be hereinafter more fully explained.

Figure 1:
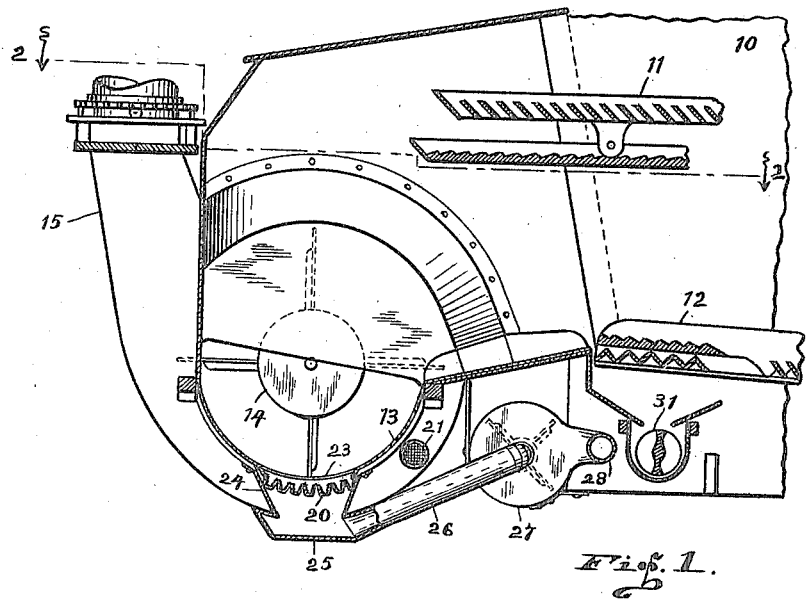
Figure 2:
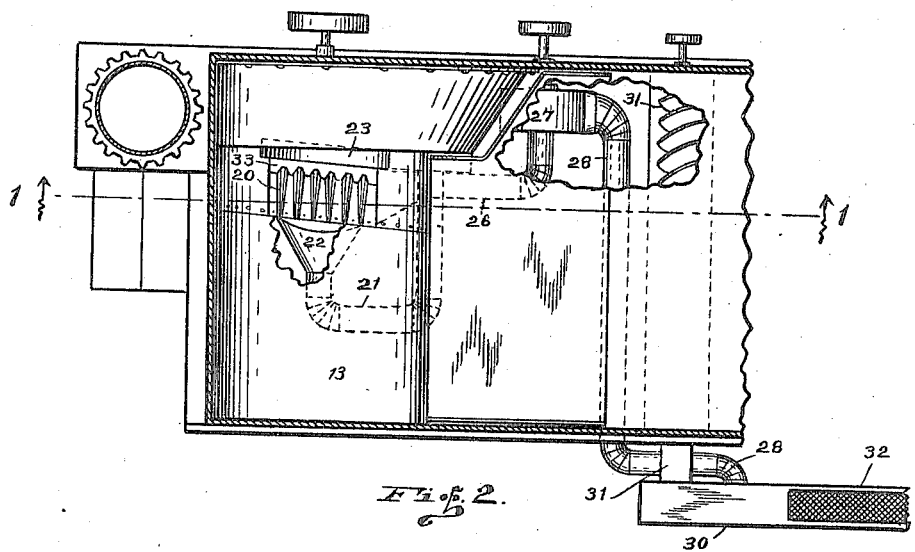

In the accompanying drawings, which form a part of my application, Figure 1 is a longitudinal sectional view taken on the dotted line 1—1 in Fig. 2, through the rear end of a threshing machine and a wind stacker, showing my invention in connection therewith, and Fig. 2 is a horizontal sectional view taken on the dotted line 2—2 in Fig. 1.

In said drawings, the portions marked 10 indicate a threshing machine provided with a suitable straw rack or conveyer, as 11, and chaff riddle or winnower, as 12, which communicate with a wind stacker comprising a straw receiving hopper, 13, burden fan, 14, and discharge chute or outlet, 15, all of any suitable construction and arrangement. In connection with said wind stacker, I provide a suitable grain trap, as 20, and associated therewith an auxiliary blast pipe, 21, having a distributing nozzle, 22, and grain deflector, 23, arranged and operating in substantially the manner shown and described in said application.

My present improvement relates essentially to means for conveying the trapped grain, which descends from the trap 20, through the hopper, 24, into a receptacle, 25, which I accomplish by connecting a duct, 26, to said receptacle, and leading the same to an exhaust fan, 27, said fan having an exhaust pipe, 28, which I preferably lead across to the opposite side of the threshing machine and so arrange the same as to enter the usual tailings elevator, 30, at a point where the discharging material and air will not interfere with the tailings conveyed by the auger, 31, into said elevator. As shown in Fig. 2, the elevator 30 is provided with a screened outlet, 32, through which air from said pipe 28 may escape.

In operation, the loose grain and unthreshed heads, mingled with the straw and chaff discharging from the racks, are deposited in the hopper 13 with such material and conveyed toward the fan 14, the blast from nozzle 22 winnowing the grain from the straw, etc., so that the grain becomes arrested in the trap and the straw passes on into the stacker fan. Said trapped grain is deflected downwardly by the deflector 23, through the space, 33, provided therefor, and falls into the receptacle, 25, from which it is withdrawn through the duct 26 by fan 27 and discharged through pipe 28 into the tailings elevator 30, by which it is conveyed, with tailings from the auger 31, back into the separator for recleaning. While I have shown and described said pipe 28 as entering the conveyer 30, it is, of course, obvious that I may lead such pipe to any other part of the separator for discharging the saved grain thereinto, or arrange the same to discharge into any other receptacle or upon the ground, without departing from my invention, and I desire to be so understood.

I claim as my invention:

1. In grain saving devices for threshing machines, the combination, with a material receiving and conveying receptacle, of a fan for withdrawing material from said receptacle and discharging the same, a grain trap interposed between said receptacle and said fan for collecting grain separated from such material before the latter passes from said receptacle into said fan, and pneumatic means communicating with said trap for withdrawing and conveying such grain therefrom.

2. In grain saving devices for threshing machines, the combination, with a material receiving and conveying receptacle, of a fan for withdrawing material from said receptacle and discharging the same, a grain trap interposed between said receptacle and said fan for collecting and saving grain separated from such material before the latter passes from said receptacle into said fan, a duct communicating with said trap, an exhaust fan communicating with said duct for withdrawing grain collected by said trap, and a discharge pipe leading from said fan for conveying such grain therefrom.

3. In grain saving devices for threshing machines, the combination, with a fan, of a material receiving and conveying receptacle, a grain trap interposed between said fan and receptacle for collecting grain passing from said receptacle and before it enters said fan, an exhaust fan communicating with said trap for withdrawing grain collected thereby, and means communicating with said exhaust fan for conveying such grain to a point of discharge.

4. In grain saving devices for threshing machines, the combination of a fan, a material receiving and conveying receptacle communicating therewith, a grain trap interposed between said fan and receptacle for collecting and saving grain from material passing through said receptacle into said fan, a winnower coöperating with said trap for separating grain from such material, and means for pneumatically withdrawing and conveying said grain from said trap.

In testimony whereof I affix my signature in presence of two witnesses.

JOSEPH K. SHARPE.

Witnesses:
LEE R. GARBER,
BRUCE NIPPLE.

Copies of this patent may be obtained for five cents each, by addressing the "Commissioner of Patents, Washington, D. C."